(12) United States Patent
Majewicz et al.

(10) Patent No.: US 9,161,026 B2
(45) Date of Patent: Oct. 13, 2015

(54) SYSTEMS AND METHODS FOR CALIBRATING AN IMAGER

(75) Inventors: Peter Ivan Majewicz, Boise, ID (US); Jennifer Lynn Melin, Boise, ID (US); Kurt Bengtson, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 474 days.

(21) Appl. No.: 13/167,226

(22) Filed: Jun. 23, 2011

(65) Prior Publication Data

US 2012/0327251 A1 Dec. 27, 2012

(51) Int. Cl.
*H04N 17/02* (2006.01)
*H04N 5/235* (2006.01)
*H04N 17/00* (2006.01)

(52) U.S. Cl.
CPC ............ *H04N 17/002* (2013.01); *H04N 5/235* (2013.01); *H04N 5/2351* (2013.01); *H04N 5/2352* (2013.01); *H04N 5/2353* (2013.01); *H04N 5/2354* (2013.01); *H04N 5/2355* (2013.01); *H04N 5/2356* (2013.01)

(58) Field of Classification Search
CPC ............... H04N 5/235–5/2354; H04N 5/2356
See application file for complete search history.

(56) References Cited

U.S. PATENT DOCUMENTS

| | | | |
|---|---|---|---|
| 5,606,392 A * | 2/1997 | Tintera et al. | 396/161 |
| 7,492,391 B1 * | 2/2009 | Kaplinsky | 348/218.1 |
| 7,599,561 B2 | 10/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 2003/0025790 A1 * | 2/2003 | Smith | 348/143 |
| 2004/0070669 A1 | 4/2004 | Aoyama | |
| 2005/0078092 A1 | 4/2005 | Clapper | |
| 2008/0018591 A1 | 1/2008 | Pittel et al. | |
| 2009/0021587 A1 | 1/2009 | Snyderman et al. | |
| 2009/0021595 A1 | 1/2009 | Zandifar et al. | |
| 2009/0086046 A1 * | 4/2009 | Reilly et al. | 348/222.1 |
| 2009/0153697 A1 * | 6/2009 | King et al. | 348/229.1 |
| 2009/0273680 A1 | 11/2009 | Palum | |
| 2011/0026087 A1 | 2/2011 | Majewicz | |
| 2011/0242054 A1 | 10/2011 | Tsu | |
| 2013/0077236 A1 | 3/2013 | Becze et al. | |

OTHER PUBLICATIONS

"Hamamatsu: Education in Digital Imaging-Charge Coupled Device Linearity" Jul. 7, 2007 http://www.learn.hamamatsu.com/articles/ccdlinearity.html.*
"QSI 532 Linearity analysis" May 17, 2011 http://canburytech.net/QSI532/Linearity.html.*
"Kellysky" Jun. 23, 2008 http://www.kellysky.net.process.htm.*

(Continued)

*Primary Examiner* — Michael Teitelbaum
(74) *Attorney, Agent, or Firm* — Taroli, Sundheim, Covell & Tummino LLP

(57) ABSTRACT

One example discloses a method for calibrating an imager. A plurality of images of a target, each having an associated integration time, are captured at the imager. A representative digital count is determined for each of the plurality of images. Integration time is represented as a function of digital count from the respective digital counts and integration times associated with the plurality of images. A calibrated integration time is calculated from a target digital count.

12 Claims, 5 Drawing Sheets

(56) References Cited

OTHER PUBLICATIONS

Unknown: "*Method and Apparatus for Producing Calibration Data for a Digital Camera*"; http://www.aagg.net/7151560.htm; pp. 1-15.

Shahram Izadi et al., "C-Slate: A Multi-Touch and Object Recognition System for Remote Collaboration using Horizontal Surfaces," Second Annual IEEE International Workshop on Horizontal Interactive Human-Computer System, 2007, pp. 3-10, IEEE.

* cited by examiner

SYSTEMS AND METHODS FOR CALIBRATING AN IMAGER

BACKGROUND

Digital imaging is the creation of digital images, typically from a physical scene. Digital imagers can include an array of light sensitive sensors to capture the image focused by the lens, as opposed to an exposure on light sensitive film. The captured image can be stored as a digital file ready for digital processing (e.g., color correction, sizing, cropping, etc.), viewing or printing.

DETAILED DESCRIPTION

One example of a digital imager system can utilize exposure calibration to account for variability of the sensor array sensitivity and any impact of illumination on image quality. For example, the digital imager can include a digital camera in a portraits booth, a staging light box, or a macroscopic system for capturing objects and documents placed on a platen. In each of these applications, the locations of the camera and the illuminating lamp or lamps are fixed. In one example of a macroscopic imaging system, multiple light sources are activated individually in succession and the resulting frames are fused into one image. Differences in exposure among the frames can cause artifacts in the image. The digital imager system uses a scene-independent exposure calibration process to provide a consistent exposure for these and other applications.

Figure 1:
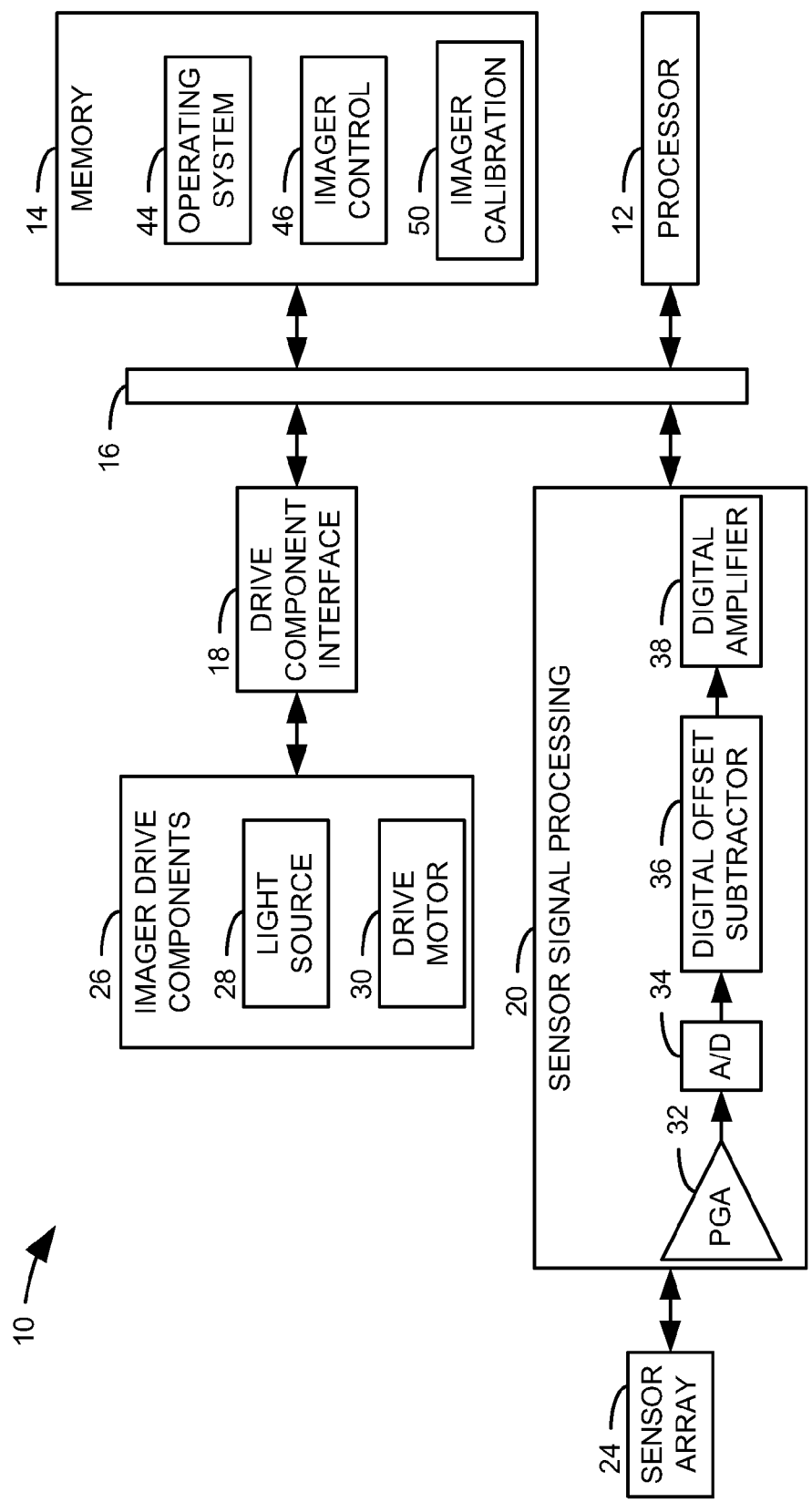
FIG. 1 illustrates an example of an imager.

FIG. 1 illustrates an example of an imager 10. The imager 10 includes a processor 12 and a memory 14, each coupled to a local interface 16. For example, the local interface 16 can include a data bus with an accompanying control bus. The memory 14 can include both volatile and nonvolatile memory components. Volatile components are those that do not retain data values upon loss of power. Nonvolatile components are those that retain data upon a loss of power. Thus, the memory 14 can include random access memory (RAM), read-only memory (ROM), hard disk drives, floppy disks accessed via an associated floppy disk drive, optical media accessed via an optical drive, magnetic tapes accessed via an appropriate tape drive, and/or other memory components, or a combination of any two or more of these memory components. In addition, the processor 12 can represent multiple processors and the memory 14 can represent multiple memories that operate in parallel. In such a case, the local interface 16 may be an appropriate network that facilitates communication between any two of the multiple processors or between any processor and any of the memories. The local interface 16 can facilitate memory to memory communication in addition to communication between the memory 14 and the processor 12.

The imager 10 further includes a drive component interface 18 and a sensor signal processing interface 20, each coupled to the local interface, and a sensor array 24 that is coupled to the local interface 16 through the sensor signal processing interface 20. The sensor array 24 includes a plurality of sensors, which can be arranged in a row, for example, to enable the scanning of lines in a document as it progresses past the sensor array 24, a two-dimensional array, or any other appropriate configuration for scanning a desired region. The plurality of sensors comprising the sensor array 24 can include, for example, active pixel sensors (e.g., complementary metal-oxide-semiconductor [CMOS] sensors) or charge coupled device (CCD) sensors. In one example, the position of the sensor array 24 can be fixed, such that a specific imaging region is defined by the arrangement and position of the sensor array.

The imager can further include a set of imager drive components 26 coupled to the local interface 16 through the drive component interface 18. The imager drive components 26 can include any components employed in the general operation of an imaging system 10. For example, the drive components can include a light source 28 for illuminating at least a portion of the imaging region defined by the position and arrangement of the sensor array. In one implementation, the light source 28 can include a light emitting diode (LED) configured to produce white light. In another implementation, the light source 28 can include light sources of various colors and frequency bands. For example, the light source 28 can include any or all of red, green, blue, and infrared LEDs that generate light that is distributed across the imaging region with a light pipe. In one example, the imager drive components 26 can also include a drive motor 30 to translate a paper document or other media past the sensor array 24.

The sensor signal processing interface 20 includes sensor signal processing circuitry to processes signals produced by the sensors in the sensor array 24 during the course of a scanning operation. In the illustrated example, the sensor signal processing interface 20 includes a programmable gain amplifier 32 that receives a sensor signal from a sensor in the sensor array 24 and applies an analog gain to the sensor signal. The sensor signal is then provided to an analog-to-digital (A/D) converter 34 to convert the amplified sensor signal into a digital signal value. The digital sensor value is then provided to a digital offset subtractor 36 that subtracts a digital offset, referred to herein as a "dark offset," from the digital value. The sensor value is then provided to a digital amplifier 38 that amplifies the sensor value by an associated digital gain to provide a digital count for the sensor. In the illustrated implementation, data associated with each color channel is subjected to a digital gain selected for the color channel, such that the digital gain applied to the output of a given sensor value depends on the color channel represented by the signal. The digital gain for each color channel, the digital offset, and the analog gain can all be determined by an associated calibration process, described in detail below, and stored in the memory 14 for use in processing the sensor signal. The resulting digital count can be provided to appropriate buffer circuitry and/or other circuitry (not shown) to be accessed by the processor 12 through the local interface 16.

The imager 10 includes various components that are stored within the memory 16 and executable by the processor 12 for performing the functionality of the imager 10. In particular, stored on the memory 16 is an operating system 44, a imager control 46, and imager calibration logic 50. The operating system 44 is executed to control the allocation and usage of hardware resources in the scanner. For example, the operating system 44 can control the allocation and usage of the memory 16. The imager control 46 is executed by the processor 12 to control the general operation of the imager 10. In particular, the scanner control system 46 can control the activation of the light source 28, the drive motor 30, and any other subsystems of the imager 10.

The imager calibration logic 50 is executed by the processor 12 to calibrate the imager, including acquiring an integration time, the dark offset, and the analog and digital gains for the imager. To this end, the imager calibration logic 50 can instruct the imager control 46 to capture a plurality of images of a target at the imager with each of the plurality of images having an associated integration time. The calibration logic then determines a representative digital count for each of the plurality of images, representing the integration time as a function of the respective digital counts from the acquired data, and calculates the calibration values from this relationship and a target digital count.

Figure 2:
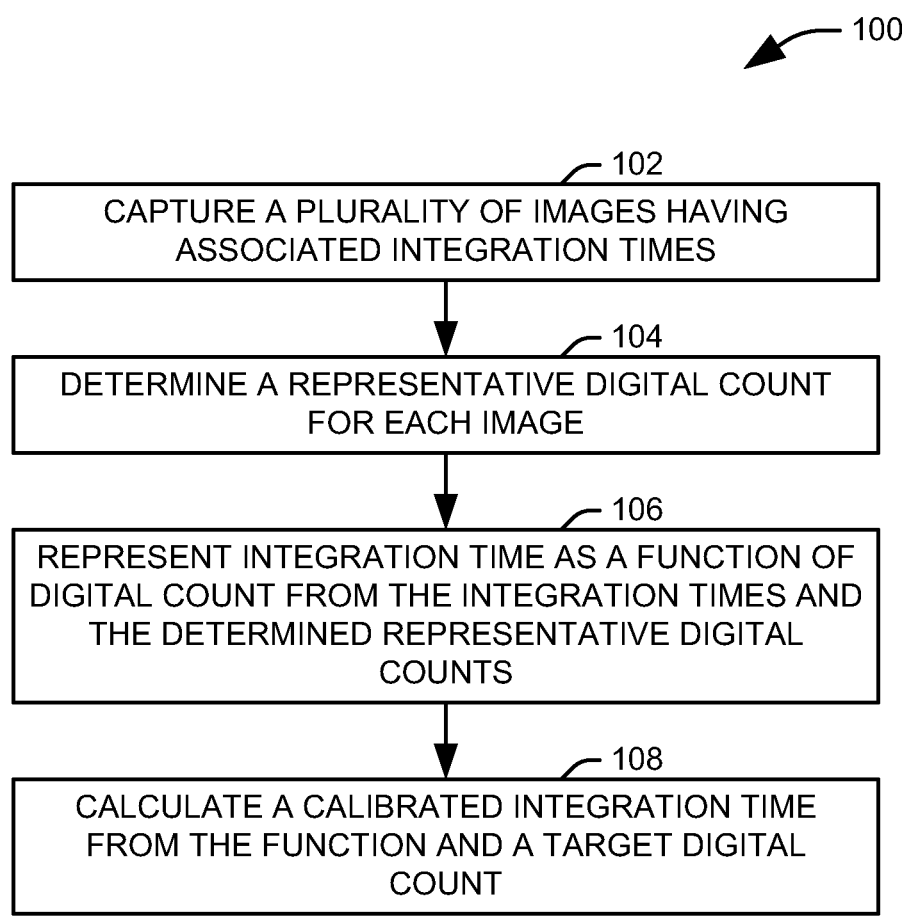
FIG. 2 illustrates an example of a methodology for calibrating an imager.

FIG. 2 illustrates an example of a methodology 100 for calibrating an imager. At 102, a plurality of images are captured at the imager, with each of the captured images having an associated integration time. For example, each of the images can be taken of a white target, with each image having one of a series of preselected integration times. In one example, a first image of the plurality of images is generated using a shortest possible integration time to allow for determination of a dark offset.

At 104, a representative digital count is determined for each of the plurality of images. In one example, the representative digital count is selected as a minimum value that is brighter than a predetermined percent of pixels within the image, for example, by calculating a cumulative histogram for each image and selecting a digital count corresponding to a target percentile. It will be appreciated that the representative digital count can be determined from analysis of the image as a whole or from analysis of a representative portion of the image. Further, a different representative digital count can be selected for each color channel within the image. At 106, a function relating integration time to digital count is determined from the determined representative digital counts and the integration times associated with the plurality of images. Where data is available for each color channel, a separate function can be determined for each color channel. In one example, images having representative digital count values exceeding a threshold value can be excluded from this process. In addition, the various digital count values can be normalized for this analysis by subtracting a determined dark offset from each value.

In one implementation, the function relating integration time to digital count is determined by representing digital count as a function of integration time from the respective digital counts and integration times associated with the plurality of images and determining an inverse function of the function representing digital count as a function of integration time. To this end, a least squares regression can be conducted on the respective digital counts and integration times associated with the plurality of images to define a second order polynomial function representing digital count as a function of integration time. A derivative of the second order polynomial function can be determined at a predetermined value for integration time, and the function representing digital count as a function of integration time can be determined as a linear function of integration time having a slope equal to the value of the derivative and an intercept parameter equal to an intercept of the second order polynomial function.

At 108, a calibrated integration time is calculated from the determined function and a target digital count. For example, the target digital count can simply be substituted into the determined function to provide the calibrated integration time. Where a function has been generated for each color channel, each function can be evaluated at an associated target digital count to produce its own integration time, with a minimal integration time from the color channels selected as the calibrated integration time. The calculated integration time can also be adjusted downward to a multiple of a flicker period associated with the light source to mitigate distortion due to flickering of the light source during illuminated imaging. In one example, the calibrated integration time can be used to calculate an analog gain for the device as well as individual digital gains for each color channel.

Figure 3:
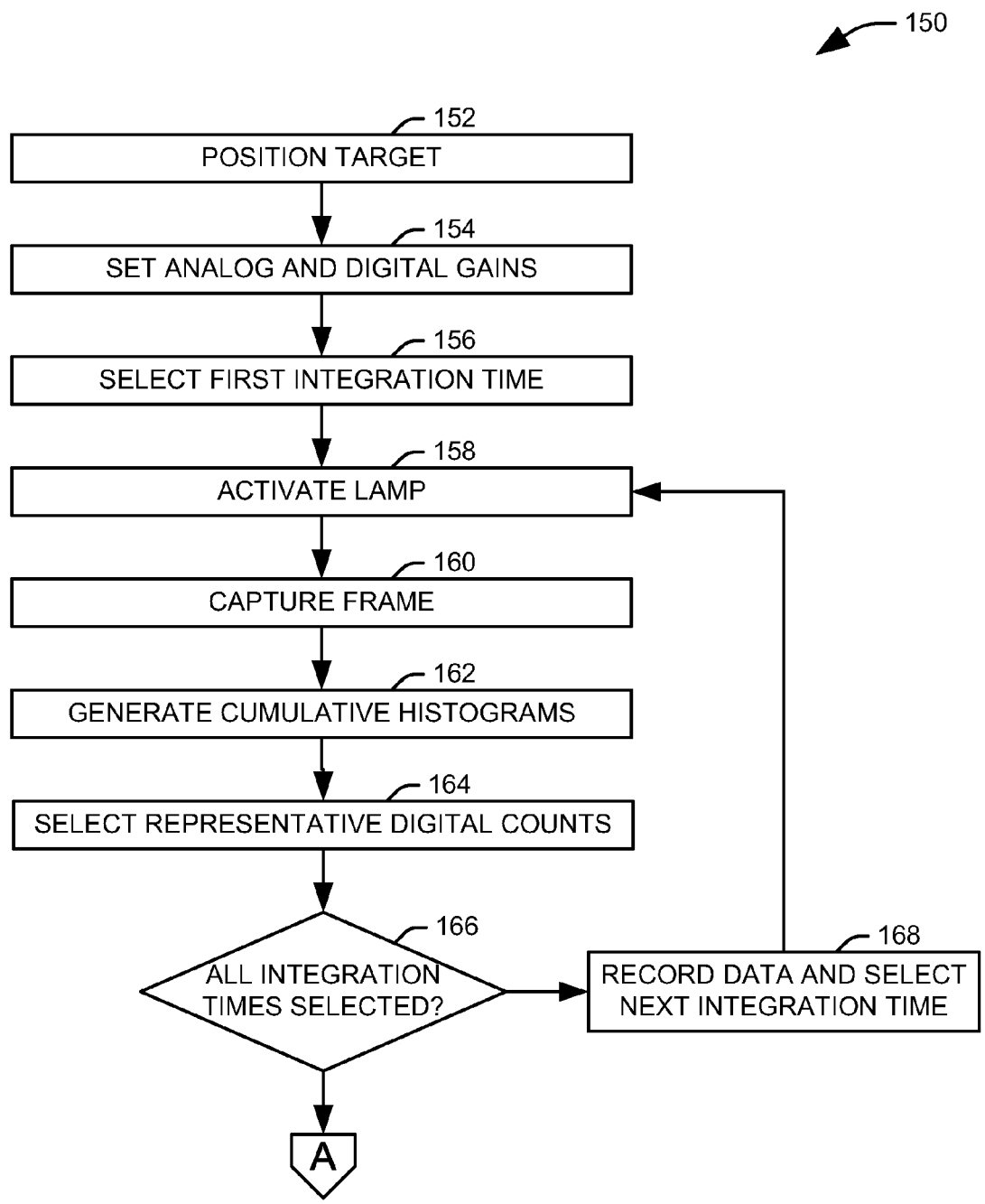
FIG. 3 illustrates an example methodology for the capture of a plurality of images having varying integration times and the analysis of those images to determine representative digital counts.

FIG. 3 illustrates an example methodology 150 for the capture of a plurality of images having varying integration times and the analysis of those images to determine representative digital counts. At 152, a white target is placed under the camera at the intended focal plane of the camera. In one example, in which the imager includes a white platen of appropriate brightness, the target can be eliminated and the platen itself used as the target. It will be appreciated that a lamp associated with the imager is positioned such that the focal plane can be illuminated by the lamp. At 154, the camera is initialized with the digital gain and all of the analog gains set to unity. At 156, a first initialization time of a predetermined series of integration times is selected. The series of integration times can include a number of pre-specified integration times that sample the expected range of suitable times. In one example, four integration times can be used to produce four images for analysis, although it will be appreciated that more or fewer times, and accompanying images, can be used, depending on the application and time and processing constraints.

At 158, the lamp is activated for a short time to illuminate the target, and the camera captures a frame while the lamp is activated at 160. At 162, cumulative histograms are created for the digital counts for each color channel within the image. It will be appreciated that the cumulative histogram can represent the entire image or a selected portion of the image. In one example, a rectangular region of each image is selected, corresponding to a region expected to receive maximum illumination by the lamp, such that a subset of the known brightest pixels is analyzed to create the cumulative histogram. At 164, a representative digital count is selected for each color channel. For example, a digital count associated with a predetermined target percentile in the cumulative histogram can be selected as a representative count. In one example, the target percentile is the ninety-ninth percentile. It will be appreciated that one goal of the calibration is to determine camera settings that give good exposure, and one aspect of this good exposure is to make the camera return a high digital count for the brightest pixels. Accordingly, this example method uses a high target percentile within the brightest portion of the image for determining the representative values.

At 166, it is determined if an image has been evaluated for each of the series of integration times. If integration times remain to be evaluated (Y), the methodology advances to 168, where the data is recorded and a next integration time is selected. In the illustrated example, the recorded data can include the integration time associated with the image and the representative digital count for each color channel. Accordingly, for each image, k, the exposure response of the system can be characterized by a vector $[I_k, P_k^R, P_k^G, P_k^B]$, where I is the integration time, $P^R$ is the representative digital count associated with the red color channel, $P^G$ is the representative digital count associated with the green color channel, and $P^B$ is the representative digital count associated with the blue color channel. The methodology then returns to 158 to capture and analyze the selected next exposure time. When all of the series of integration times have been analyzed (N), the capture and analysis of the plurality of images to determine representative digital counts for various integration times is complete.

Figure 4:
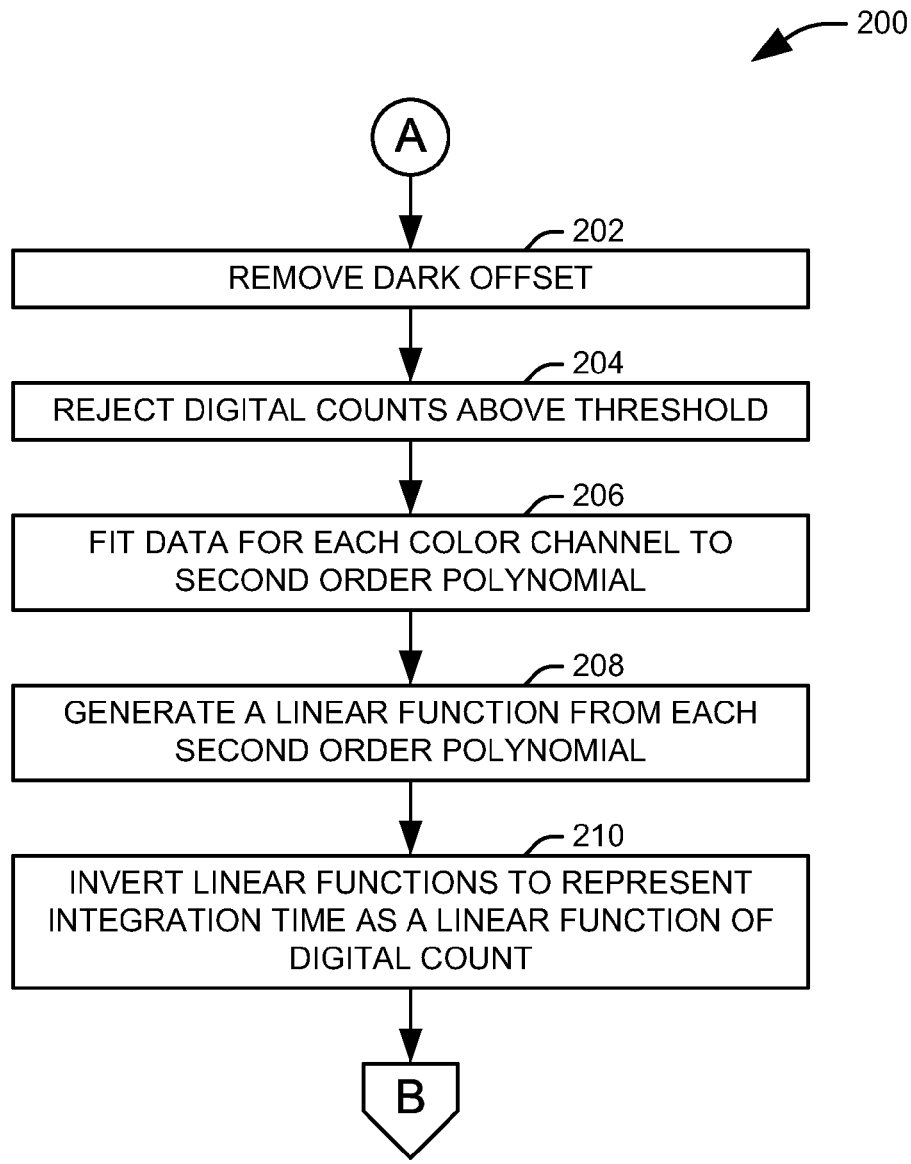
FIG. 4 illustrates an example of a methodology for representing integration time as a function of digital count from respective digital counts and integration times associated with a plurality of images.

FIG. 4 illustrates an example of a methodology 200 for representing integration time as a function of digital count from the respective digital counts and integration times associated with the plurality of images generated in FIG. 3. At the start of the methodology, a set of vectors, of the form $[I_k, P_k^R, P_k^G, P_k^B]$, represent representative digital counts for each of the red, green, and blue color channels and an integration time for each of the plurality of images of a white target. At 202, a dark offset is calculated from one of the plurality of images having an integration time corresponding to a target integration time for determining the dark offset and the vectors representing the remaining images are adjusted to remove the effect of the dark offset. In one implementation, the integration time is a shortest possible integration time for the imaging system. In a line scan camera, this can be an integration time of one line. Accordingly, representing the image used for calculating the dark offset with an index of zero, the dark offset, $P_{OFF}$, can be determined as the average of the representative digital counts for each color channel of the image, such that:

$$P_{OFF} = \frac{P_0^R + P_0^G + P_0^B}{3} \qquad \text{Eq. 1}$$

To remove the effects of the dark offset from the calibration analysis, the determined dark offset value can be subtracted from the representative counts associated with all of the remaining images of the plurality of images.

At 204, any representative digital count values exceeding a threshold value are removed. In other words, if the value of a representative digital count for color channel for a given image exceeds the threshold, the vector representing that image is not used for further calibration analysis relating to that color channel. It will be appreciated, however, that the other representative digital count values from the vector can be used in the analysis relating to their respective color channels. The removal of data points above the target digital count is beneficial because those data points are more likely to be from frames which have saturated pixels, and data from frames with a significant number of saturated pixels can introduce error into the calibration analysis.

At 206, the remaining representative count data and the integration times are utilized in a least squares regression for each color channel to represent the digital counts as a second order polynomial function of the integration times. Accordingly, for each of the color channels, the regression analysis produces a second order polynomial having a second order coefficient, a linear coefficient, and an intercept representing the relationship of integration time to digital count. A second order curve fitting is used, rather than a linear model, to account for output droop of the light source. For example, LED lamps can experience considerable heat-induced droop as it is activated many times during the high duty cycle used to generate images during calibration. The use of the regression analysis provides robustness against noise, but, in one example, a goodness-of-fit check can be performed to catch badly corrupted data To this end, an Analysis of Variance (ANOVA) regression coefficient, R, is calculated for each regression analysis as:

$$\mathcal{R} = \sqrt{1 - \frac{SS_{REG}}{SS_{TOT}}} \qquad \text{Eq. 1}$$

where $SS_{REG}$ is the sum of squares explained by the regression model and $SS_{TOT}$ is the total sum of squares.

If R is greater than pre-specified threshold for any of the three regression models, then the images are considered to contain corrupt data from malfunctioning hardware and an error flag is posted halting execution of the calibration. In one example, the pre-specified threshold can be 0.92.

During normal operation, the light source can be operated in a low duty cycle, in which any droop can be ignored, and the digital count can be expected to vary linearly with the integration time. Accordingly, at 208, each second order curve can be used to generate a linear function relating integration time and digital count for each color channel. In one example, a value for the derivative of the second order curve with respect to integration time can be determined at a target integration time for each curve. Using this value as the slope and the intercept value of the second order polynomial function as the intercept value, a polynomial relating digital count as a linear function of integration time can be generated for each color channel. At 210, each linear function is inverted to represent integration time as a linear function of digital count.

Figure 5:
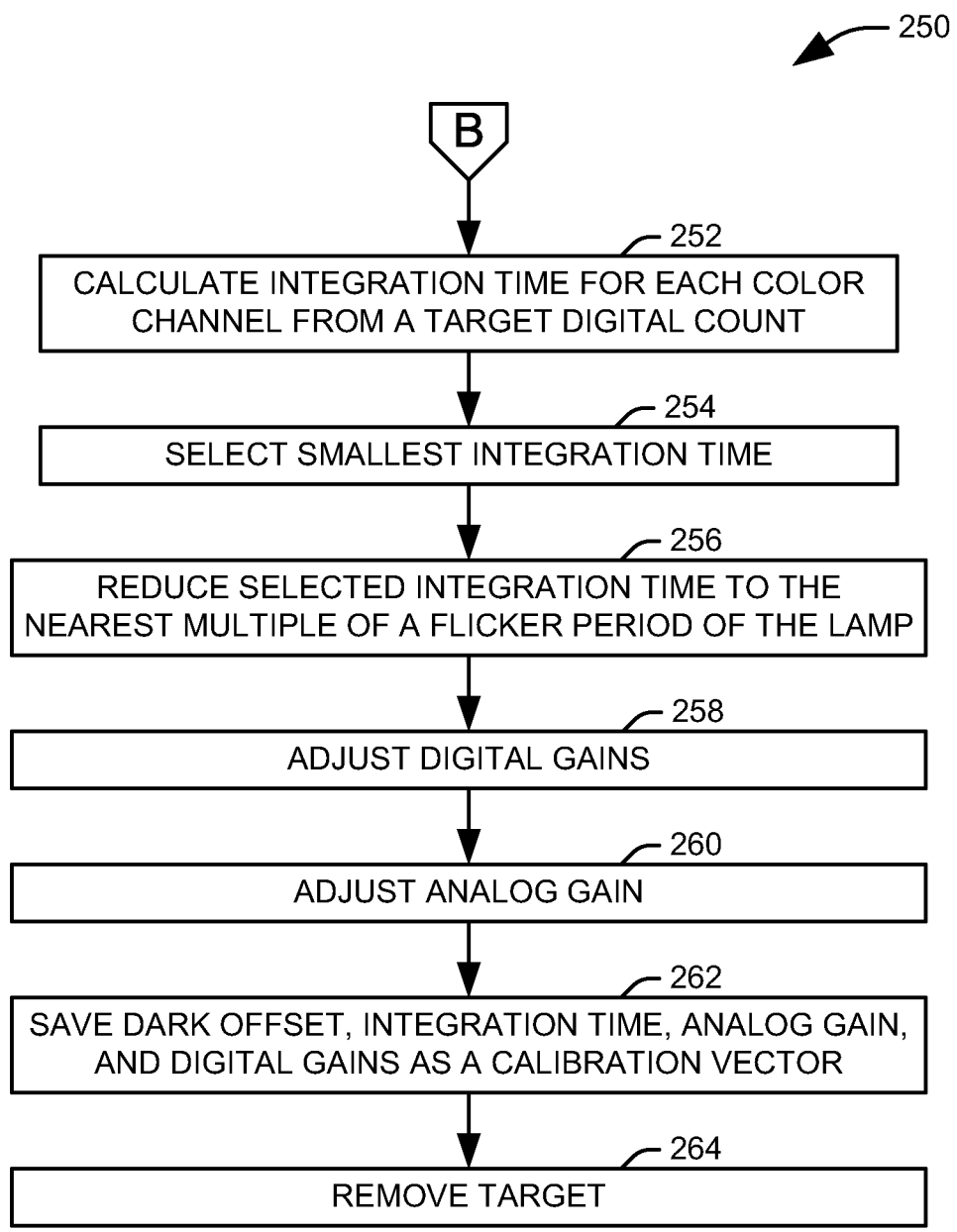
FIG. 5 illustrates an example of a method for calculating an integration time and other calibration parameters for the imager system.

FIG. 5 illustrates an example of a method 250 for calculating an integration time and other calibration parameters for the imager system from the relationship between integration time and digital count determined in FIG. 4. At 252, a linear function relating integration time and digital count for each color channel is evaluated at a target digital count value to produce an integration time for each color channel. The calculated integration times, taken in concurrence with the dark offset and default gain values determined in FIGS. 3 and 4, provide an exposure calibration for the system. In the illustrated example, however, the exposure calibration can be further refined, for example, to facilitate its use in a system that uses a single integration time for all three color channels.

At 254, a smallest integration time of the integration times calculated for the color channels is selected. At 256, the selected integration time can be reduced to a nearest multiple of a flicker period associated with the light source or an expected flicker period of an external light source. In one example, a rolling shutter associated with the sensor array beats with an external light source, such as a magnetic-ballasted fluorescent light, which flickers at twice the alternating current (AC) line current. A light run operated with a sixty Hertz current has flicker frequency of one hundred and twenty Hertz. The rolling shutter mechanism of the sensor translates the time frequency into a spatial frequency in the frame. For one example shutter, one hundred and twenty Hertz is translated into 72.3090 lines, while an external light source fed by an AC line with a frequency of fifty Hertz translates into 86.7708 lines. Accordingly, the integration time can be reduced down to the nearest multiple of the flicker line period and the reduction can be compensated for by increasing the analog gain. Since the calibrated integration time is a multiple of the flicker line period, the rolling shutter will capture exactly full periods of the flicker, and any flicker effect will be avoided.

At 258, new digital gains are calculated to adjust for the calibrated integration time, $I_C$. A digital gain, D, for each of the color channels can be determined as:

$$D^X = \frac{P^{TARGET}}{I_C \beta^X + \gamma^X} \qquad \text{Eq. 3}$$

where $P^{TARGET}$ is a target digital count value, X is an index for the plurality of color channels, $\beta^X$ is the slope of the linear equation determined in FIG. 4 for a color channel, X, and $\gamma^X$ is the intercept of the linear equation for the color channel.

At 260, the analog gain of the system is adjusted for the new digital gains. It will be appreciated that without the flicker compensation at 256, the digital gain corresponding to the smallest integration time will always be one. With the flicker compensation, the digital gains will all be expected to exceed one. In one example, analog gain can be substituted for digital gain, as analog gain does not introduce quantization noise. To this end, the calibrated analog gain can be set to the value of the smallest of the three digital gains determined at 258. Each digital gain can then be reduced to provide a total gain equivalent to the original digital gain from 258. For example, each digital gain value can be divided by the new analog gain value. It will be appreciated that, in this example, at least one of the digital gains will be equal to one.

At 262, the final calibration vector, comprising the integration time from 254, the dark offset from FIG. 4, and the analog and digital gains from 260, can be saved into a memory of the imager system. When using this calibration vector to capture typical diffuse nonluminescent content, the minimum digital count for a given frame should be zero and a maximum digital count for any given color channel should be equal to the target digital count, $P^{TARGET}$. Image noise will be minimized, as the calibration provides an optimal distribution among the four exposure parameters. The technique can be repeated for each light source in imagers with multiple light sources, and can be expected to provide sufficient accuracy to enable stitching and fusing of frames illuminated with different light sources. One example of the imager system uses three lamps and ambient illumination, and combines four frames into one. At 264, the white target is removed, if present, and the method terminates. It will be appreciated that the technique is completely self-contained if the white target is built into a portion of the imager system, such as a platen, and thus no special targets or measuring devices are required. Only the white target, which can be integrated into the imager in some applications, needs to be tightly specified, providing a cost effective solution for calibration.

Where the disclosure or claims recite "a," "an," "a first," or "another" element, or the equivalent thereof, it should be interpreted to include one or more than one such element, neither requiring nor excluding two or more such elements. Furthermore, it will be understood that successively described examples are not mutually exclusive unless specific stated to be so. It will also be appreciated that when a functional component is described as stored on a computer readable medium, it can be stored on a single medium or a set of media, each operably connected to another medium in the set or an associated processing unit. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A method for calibrating an imager comprising:
   capturing a plurality of images of a target with a sensor array of the imager, each of the plurality of images having an associated integration time;
   determining a representative digital count for each of the plurality of images;
   representing integration time as a function of digital count from the respective digital counts and integration times associated with the plurality of images; and
   calculating a calibrated integration time from a target digital count
   wherein determining a representative digital count for each of the plurality of images comprises determining a digital count for each of a plurality of color channels associated with the image to provide a set of representative digit counts, and representing integration time as a function of digital count comprises determining a polynomial function representing integration time as a function of digital count for each color channel, and calculating a calibrated integration time from a target digital count comprises calculating respective calibrated integration times for the plurality of color channels from their respective associated polynomial functions and the target digital count, the method further comprising selecting a minimum calibrated integration time of the calibrated integration times.

2. The method of claim 1, wherein determining a representative digital count for each of the plurality of images comprises calculating a cumulative histogram for each image and selecting a digital count corresponding to a target percentile.

3. The method of claim 2, wherein calculating the cumulative histogram for each image comprises calculating the cumulative histogram for a preselected region of each image corresponding to an expected region of maximum illumination.

4. The method of claim 1, representing integration time as a function of digital count from the respective digital counts and integration times associated with the plurality of images comprises:
   representing digital count as a function of integration time from the respective digital counts and integration times associated with the plurality of images; and
   determining an inverse function of the function representing digital count as a function of integration time.

5. The method of claim 4, wherein representing digital count as a function of integration time from the respective digital counts and integration times associated with the plurality of images comprises conducting a least squares regression on the respective digital counts and integration times associated with the plurality of images to define a polynomial function, having an associated intercept parameter, representing digital count as a function of integration time.

6. The method of claim 5, the polynomial function comprising a second-order polynomial function, the method further comprising determining a value of a derivative of the second-order polynomial function with respect to integration time at a predetermined value for integration time, wherein representing digital count as a function of integration time comprises representing the digital count as a linear function of integration time having a slope equal to the value of the derivative and an intercept parameter equal to that of the polynomial function.

7. The method of claim 1, further comprising reducing the calibrated integration time to a nearest multiple of a flicker period associated with a light source.

8. The method of claim 1, wherein capturing a plurality of images of a target at the imager comprising capturing a first image of the plurality of images having a shortest possible integration time, the method further comprising subtracting a representative digital count associated with the first image from each of the representative digital counts associated with the remaining images of the plurality of images as a dark offset.

9. The method of claim 1, further comprising:
comparing the representative digital count associated with each of the plurality of images to a threshold value; and
rejecting the representative digital count associated with an image of the plurality of images if the representative digital count exceeds the threshold value, such that the representative digital count and associated integration time of the image are not used in representing integration time as a function of digital count.

10. A method for calibrating an imager comprising:
capturing a plurality of images of a target at the imager, each of the plurality of images having an associated integration time;
determining a representative digital count for each of the plurality of images;
eliminating each representative digital count above a threshold value to provide a subset of the representative digital counts;
conducting a least squares regression on the subset of the respective digital counts and the integration times associated with their respective associated images to represent digital count as a second-order polynomial function of integration time having an associated intercept value;
determining from the second-order polynomial function a linear representation of digital count as a function of integration time having a slope equal to a value of a derivative of the second-order polynomial function at a target integration time and the associated intercept value;
finding an inverse of the linear representation of digital count as a function of integration time to provide a representation of integration time as a function of digital count; and
evaluating the representation of integration time as a function of digital count at a target value for digital count to calculate a calibrated integration time for the system.

11. An imager system comprising:
a sensor array;
a processor; and
a memory storing executable instructions comprising:
an imager control to instruct the sensor array to capture a plurality of images having associated integration times; and
calibration logic to:
determine a representative digital count for each of the plurality of images;
represent integration time as a function of digital count from the respective digital counts and integration times associated with the plurality of images;
calculate a calibrated integration time from a target digital count;
determine a representative digital count for each of the plurality of images comprising a digital count for each of a plurality of color channels associated with each of the plurality of images to provide a set of representative digit counts;
determine an integration time represented as a function of digital count comprising a polynomial function representing integration time as a function of digital count for each color channel; and
calculate a calibrated integration time from a target digital count comprising a respective calibrated integration time for each of the plurality of color channels from their respective associated polynomial functions and the target digital count, and select a minimum calibrated integration time of the calibrated integration times.

12. The imager system of claim 10, the calibration logic further determining one of an analog gain and a digital gain from the plurality of images captured by the sensor array.

* * * * *

UNITED STATES PATENT AND TRADEMARK OFFICE
CERTIFICATE OF CORRECTION

PATENT NO. : 9,161,026 B2
APPLICATION NO. : 13/167226
DATED : October 13, 2015
INVENTOR(S) : Peter Ivan Majewicz et al.

It is certified that error appears in the above-identified patent and that said Letters Patent is hereby corrected as shown below:

On the title page item (74), Name of the Attorney, in column 2, line 1, delete "Taroli," and insert -- Tarolli, --, therefor.

Signed and Sealed this
Twenty-sixth Day of April, 2016

Michelle K. Lee
*Director of the United States Patent and Trademark Office*